United States Patent [19]
Dedrick

[11] Patent Number: 5,696,965
[45] Date of Patent: Dec. 9, 1997

[54] ELECTRONIC INFORMATION APPRAISAL AGENT

[75] Inventor: Rick Dedrick, Hillsboro, Oreg.

[73] Assignee: Intel Corporation, Santa Clara, Calif.

[21] Appl. No.: 333,962

[22] Filed: Nov. 3, 1994

[51] Int. Cl.⁶ .................................................. G06F 17/30
[52] U.S. Cl. .................... 395/610; 395/613; 395/615; 395/201; 395/232; 379/67; 380/29
[58] Field of Search ...................... 395/600, 610, 395/613, 615, 201, 232; 364/401, 408, 403; 379/67; 358/257, 86; 380/29

[56] References Cited

U.S. PATENT DOCUMENTS

| | | | |
|---|---|---|---|
| 4,532,554 | 7/1985 | Skala | 358/257 |
| 4,714,996 | 12/1987 | Gladney et al. | 395/600 |
| 4,850,007 | 7/1989 | Marino et al. | 379/67 |
| 4,992,940 | 2/1991 | Dworkin | 364/401 |
| 5,014,125 | 5/1991 | Pocock et al. | 358/86 |
| 5,133,075 | 7/1992 | Risch | 395/800 |
| 5,144,663 | 9/1992 | Kudelski et al. | |
| 5,155,591 | 10/1992 | Wachob | |
| 5,162,989 | 11/1992 | Matsuda | |
| 5,220,501 | 6/1993 | Lawlor et al. | 364/408 |
| 5,237,157 | 8/1993 | Kaplan | |
| 5,267,171 | 11/1993 | Suzuki et al. | |
| 5,283,731 | 2/1994 | Lalonde et al. | 364/401 |
| 5,339,239 | 8/1994 | Manabe et al. | |
| 5,408,417 | 4/1995 | Wilder | |
| 5,418,713 | 5/1995 | Allen | 364/403 |

OTHER PUBLICATIONS

NYNEX Prodigy Services, "NYNEX Plans Interactive Yellow Pages Project With Prodigy"; Common Carrier Week; Dec. 13, 1993; Warren Publishing, Inc. © 1993 (2 pages).

Lambert, Peter, "Time Warner: Ad Ventures Will Keep FSN Prices Lower"; Multichannel News; May 9, 1994; p. 32 (2 pages).

Dialog, "Service Plan Options" Apr. 1993 (2 pages).

*Primary Examiner*—Thomas G. Black
*Assistant Examiner*—Cheryl Lewis
*Attorney, Agent, or Firm*—Blakely, Sokoloff, Taylor & Zafman

[57] ABSTRACT

An electronic information appraisal agent which operates within an electronic information distribution system and includes an electronic information server having multiple electronic information units. Requests for electronic information are transferred from the appraisal agent to an electronic information server, which compares the contents of the server to a set of search criteria. In one embodiment, the server returns a set of electronic information to the appraisal agent which matches the search criteria. In another embodiment, the server returns information indicating whether the search criteria matched any information in the server. In one embodiment, the electronic information distribution system also includes a metering server which is coupled to the electronic information server and the client system. The metering server allows multiple client systems to receive electronic information units from the electronic information server.

22 Claims, 4 Drawing Sheets

ELECTRONIC INFORMATION APPRAISAL AGENT

BACKGROUND OF THE INVENTION

1. Field of the Invention

The present invention pertains to electronic information distribution networks. More particularly, this invention relates to an appraisal agent which obtains electronic information from electronic information servers on behalf of an individual end user.

2. Background

Computer technology is continuously advancing, providing newer computer systems with continuously improved performance. One result of this improved performance is an increased use of computer systems by individuals in a wide variety of business, academic and personal applications. In some instances, these computer systems are linked together by a network or modems so that the systems can communicate with each other via electronic mail.

The current wide-ranging use of computer systems provides a relatively large potential market to providers of electronic content or information. These providers may include, for example, advertisers and other information publishers such as newspaper and magazine publishers. Presently, however, there are no systems which allow an individual end user to automatically access specific units of this electronic information from these providers which appeal to him or her. That is, no mechanism currently exists which allows the individual user to access only that information which has a high probability of appealing to him or her without actually browsing through all of the information himself or herself. Thus, it would be beneficial to provide a mechanism which allows an individual to automatically access specific units of electronic information which have a high probability of appealing to him or her.

In addition, it would be beneficial to provide a system which automatically retrieves electronic information for an individual user in accordance with the user's characteristics which are observed by the system. That is, a system which automatically retrieves units of electronic information having a high probability of appealing to the end user.

Furthermore, them are presently no systems for generating and transmitting electronic advertisements to end users operating a computer via an end-to-end electronic information distribution network. Thus, it would be beneficial to provide a system which allows an individual end user to access specific electronic advertisements which are most appealing to him or her.

In addition, many consumers do not enjoy advertisements being forced upon them. Thus, it would be advantageous to provide a system which gives consumers some control over what types of electronic information they receive and when they receive it.

The present invention provides for these and other advantageous results.

SUMMARY OF THE INVENTION

An electronic information appraisal agent is described herein. The appraisal agent operates within an electronic information distribution system which includes an electronic information server having multiple electronic information units. Requests for electronic information are transferred from the appraisal agent to an electronic information server, which compares the contents of the server to a set of search criteria. In one embodiment, the server returns a set of electronic information to the appraisal agent which matches the search criteria. In another embodiment, the server returns information indicating whether the search criteria matched any information in the server.

In one embodiment, the electronic information distribution system also includes a metering server which is coupled to the electronic information server and the client system. The metering server allows multiple client systems to receive electronic information units from the electronic information server.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Figure 1:
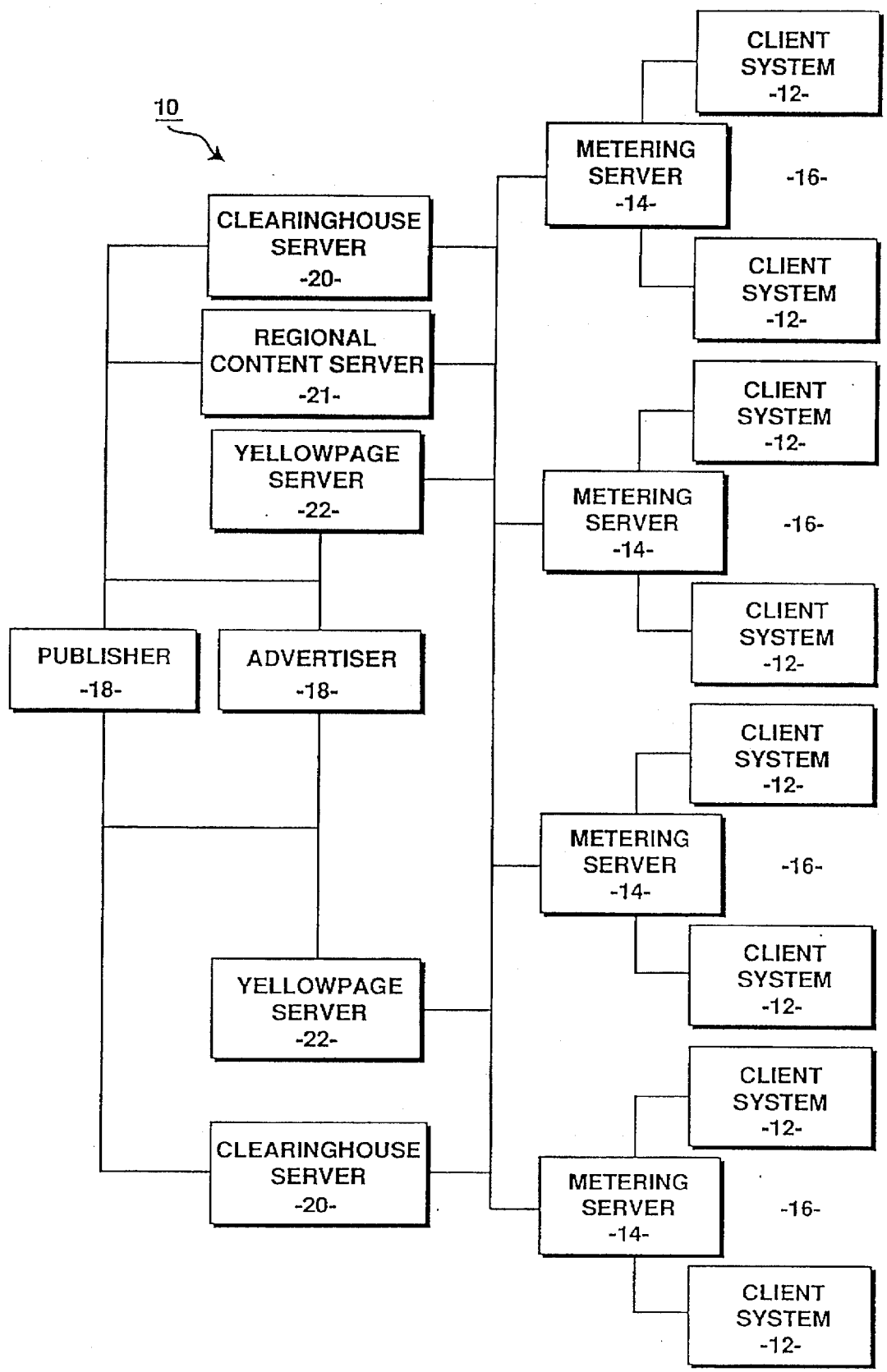
FIG. 1 is a schematic of a network of one embodiment of the present invention.

FIG. 1 shows a network system 10 of one embodiment of the present invention. The network 10 includes a plurality of client systems 12 coupled to a metering server 14 within a local area network (LAN) 16. Alternatively, a single client system 12 may be coupled to a metering server 14. Each client system 12 may be a personal computer that is operated by an end user. Alternatively, each client system 12 may be any other type of consumer consumption device, such as a television set, a game machine, etc. The server 14 is typically a dedicated computer that provides an interconnect contact node which allows the client systems 12 to communicate with the server 14 and other client systems 12. The server 14 may contain resident modem sharing software that allows the server 14 and client systems 12 to communicate with a device external to the local network 16. The server 14 is also capable of maintaining resident databases. Both the server 14 and the client systems 12 contain the necessary interface hardware and software required to transfer information between the components of the system 10.

The metering server 14 is coupled to a publisher unit 18 through a plurality of clearinghouse servers 20. By way of example, the publisher 18 may be connected to the server 14 as part of an overall wide area network (WAN) that allows the server 14 and publisher unit 18 to transfer information. The system 10 may also have a yellow page server 22 coupled to the publisher unit 18 and the metering servers 14. The publisher unit and servers of the WAN system contain the interface hardware and software necessary to transfer electronic information between the components of the system. As shown in FIG. 1, the system 10 may have multiple client systems 12 coupled to a single metering server 14 and multiple servers 14 coupled to a single clearinghouse server 20, a regional content database server 21 and a single yellow page server 22. There may be multiple clearinghouse and yellow page servers located at regional centers throughout the country/world. In addition, depending on the size of a community, there may also be multiple yellow page servers for each local community. Although the publisher 18 is referred to as a publishing unit, it is to be understood that the publisher unit 18 can also be a node for an advertiser 18 and that the use of the terms publisher and advertiser may be synonymous.

Each client system 12 is provided with an interface, such as a graphic user interface (GUI), that allows the end user to participate in the system 10. The GUI contains fields that receive or correspond to inputs entered by the end user. The fields may include the user's name and possibly a password. The GUI may also have hidden fields relating to "consumer variables." Consumer variables refer to demographic, psychographic and other profile information. Demographic information refers to the vital statistics of individuals, such as age, sex, income and marital status. Psychographic information refers to the lifestyle and behavioral characteristics of individuals, such as likes and dislikes, color preferences and personality traits that show consumer behavioral characteristics. Thus, the consumer variables refer to information such as marital status, color preferences, favorite sizes and shapes, preferred learning modes, employer, job title, mailing address, phone number, personal and business areas of interest, the willingness to participate in a survey, along with various lifestyle information. This information will be referred to as user profile data. The end user initially enters the requested data and the non-identifying information is transferred to the metering server 14. That is, the information associated with the end user is compiled and transferred to the metering server 14 without any indication of the identity of the user (for example, the name and phone number are not included in the compilation). The GUI also allows the user to receive inquiries, request information and consume information by viewing, storing, printing, etc. The client system may also be provided with tools to create content, advertisements, etc. in the same manner as a publisher/advertiser.

All of the fields in the GUI relating to consumer variables are hidden from the consumer. The display of the GUI is based upon these fields, but the GUI does not display them to the user except when the user brings up a "profile editor", as discussed in more detail below. Thus, the monitoring of consumer actions and inactions based on the consumer variables and the updating of user profile data is transparent to the consumer. In addition, modifications made to the electronic information to customize it to a particular consumer are also transparent to the consumer.

The publisher/advertiser 18 is provided with software tools to create electronic information which includes content and advertisements that can be transmitted over the system. The electronic information may allow an end user to access a content database, or the information may be all or a portion of a content database. By way of example, the content database may be the text and video of an electronic newspaper. The content database may reside within the publisher unit or be located at a remote location such as the metering server or a regional server that services a plurality of metering servers. The software tools may include a hypertext oriented mark up language that routes distributed end users to the content databases.

In one embodiment, the software tools provided to the publisher/advertiser 18 include software tools for embedding consumer variables within electronic information. The embedded consumer variables enable a client activity monitor and a consumption device to monitor consumer interaction with the electronic information based on the consumer's interaction with the unit of information currently being consumed. This interaction includes both inputs by the consumer and actions which the consumer could have taken but chose not to. In one implementation, the publisher/advertiser 18 is provided with a GUI which allows the publisher/advertiser 18 to select certain consumer variables from a set of consumer variables and associate the selected variables with specific objects or fields within the electronic information. For example, the electronic information may include several option fields from which end users may select. The publisher/advertiser 18 may associate a color preference variable with these option fields, thereby indicating to the client systems 12 to track the color of the option field selected by the end user.

The publisher/advertiser 18 is also provided with software tools to create electronic information in a wide variety of consumption formats that can be transmitted over the system. These consumption formats include formats such as audio, video, graphics, animation, text, etc. For example, an advertiser 18 may create an advertisement for a camera which describes the camera in both audio and video format. Both of these consumption formats are transferred to the metering servers 14, and subsequently to the client systems 12. The end user is then able to consume the advertisement in whichever format he or she prefers, or alternatively in both formats.

In one embodiment, each piece of electronic information received by client system 12 includes a header block which includes the consumer variables and their related objects or fields for that piece of electronic information. For example, the header block of a given piece of electronic information may include an indicator that a color preference variable is associated with certain option fields. In addition, default colors for particular fields or objects, or a default consumption format, such as audio or video, for the electronic information may also be included in the header block.

Figure 2:
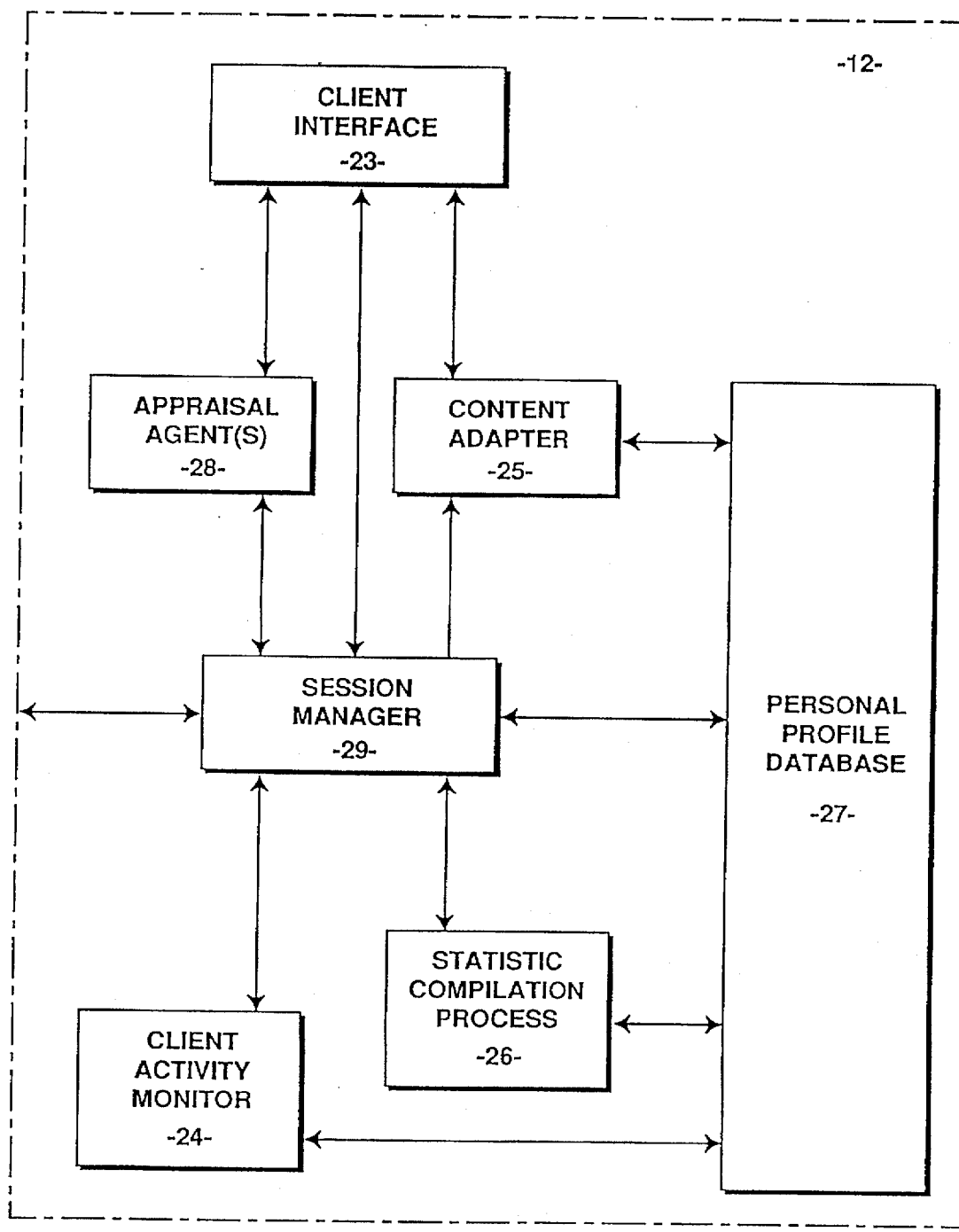
FIG. 2 is a schematic of a client system in one embodiment of the present invention.

As shown in FIG. 2, each client system 12 includes a session manager 29, a client interface 23, a client activity monitor 24, a content adapter 25, a statistic compilation process 26, and a personal profile database 27. The client interface 23 provides individual users with access to the system 10. Interface 23 may be any of a wide variety of user interaction devices. For example, the client interface 23 may be the display device and input device of a personal computer based on an Intel® microprocessor architecture. Alternatively, the client interface 23 may be a display and input device coupled to, or part of, any of a wide variety of consumer consumption devices, such as a television set or a game machine. In one embodiment, the client interface 23 is a physical device which is separate from the remainder of client system 12. For example, client interface 23 may be a personal computer system, while the remaining components of client system 12 are contained in a separate box or similar physical device coupled to the personal computer system. Interface 23 supports any one or more of a wide variety of conventional input methods, including alphanumeric keyboard inputs, voice inputs, cursor control inputs (such as a mouse or trackball), touchscreen inputs, etc.

Session manager 29 transfers data and control information to and from the components of client system 12, and acts as an interface between client system 12 and metering server 14. Electronic information which is transferred to client system 12 is received by session manager 29 and forwarded to client interface 23. In one embodiment, the electronic information is forwarded to client interface 23 via content adapter 25. Content adapter 25 may then modify the electronic information, based on the end user's data stored in personal profile database 27. Session manager 29 also instructs statistic compilation process 26 to compile the aggregate data stored in personal profile database 27 when the information is requested by metering server 14.

The client activity monitor 24 tracks the consumer variables corresponding to the preferences of the end user(s) of client system 12. When an end user consumes electronic information, and also possibly interacts with that electronic information, client activity monitor 24 associates the electronic information with the appropriate consumer variables and stores this data in the personal profile database 27. For example, the client activity monitor 24 tracks the color of fields or objects that are selected most frequently and least frequently by the end user. Similarly, the consumption format chosen most frequently and least frequently by the end user, such as audio or video, is also tracked and stored in personal profile database 27. In one embodiment, the consumer variables and corresponding fields or objects are indicated in a header block received with the electronic information.

The personal profile database 27 maintains the user profile data for the end user(s) of client system 12. For example, age, gender, income, marital status, color preferences, etc. are stored in personal profile database 27 for each individual end user of client system 12. In addition, personal profile database 27 may also include additional information such as credit card numbers, social security numbers, mailing addresses, preferred shipping methods, etc. for each individual end user to facilitate ordering items displayed in advertisements.

Personal profile database 27 is updated with user profile information based on the activity monitored by client activity monitor 24. In one embodiment, this information can also be directly modified by the end user. For example, client interface 23 may include the ability to access the user profile data for a particular end user which is stored in personal profile database 27, such as through a GUI profile editor. The end user is then able to alter this data, which is then returned to metering server 14 (via statistic compilation process 26 discussed below), and used by content adapter 25 discussed below.

In one embodiment, the information in personal profile database 27 is protected from access by anyone other than the individual who is associated with the information. For example, the information may be protected on a computer by encrypting the profile when it is not in use. Alternatively, the information may be stored on a removable nonvolatile storage device, such as a PCMCIA Flash memory card. Thus, an individual may remove the Flash-based profile card from a computer and thereby remove the risk of exposure of private information to other individuals operating in the network system 10. In addition, since the profile is removable, individual end users can move a profile from computer to computer, such as between office and home.

All of the information stored on the removable storage device is also encrypted. To access the consumer profile, the consumer inserts the card into the client system 12, which prompts the consumer for a personal identification number (PIN) or password. Upon receiving the correct PIN, the client system 12 decrypts the profile information in the storage device and stores the decrypted profile information in the client system's volatile memory. The consumer is then able to utilize the profile (transparently). The profile in volatile memory is re-encrypted periodically and stored back to the storage device. When the consumer finishes using the client system 12, the final profile revision is encrypted and stored in the storage device. The card is then ejected from the client system 12 and pocketed by the consumer, and the un-encrypted profile information in the volatile memory is deleted.

The content adapter 25 customizes electronic content to the individual end user based on the user profile data contained in personal profile database 27. Electronic content received by system 12 from metering server 14 may include fields which can be customized. Which fields can be customized may be indicated in a header block received with the electronic content. For example, a unit of electronic information may be received with a particular field having the default color of green. If personal profile database 27 contains sufficient data regarding color preferences for the individual end user, then content adapter 25 changes the color of that particular field from green to whatever color preference is contained in personal profile database 27 for that individual end user. Similarly, the default consumption format may be video, but if personal profile database 27 indicates that the end user prefers audio format, then content adapter 25 delivers the audio format version of the electronic information to the client interface 23 rather than the video version.

Data is collected for personal profile database 27 by direct input from the end user and also by client activity monitor 24 monitoring the end user's activity. When the end user consumes a piece of electronic information, each variable (or a portion of each variable) within the header block for that piece of electronic information is added to the database for this end user. For example, if this piece of electronic information is made available to the end user for consumption in both audio and video format, and the end user selects the audio format, then this selection is stored in personal profile database 27 for this end user.

When sufficient data has been collected for a particular consumer variable, then content adapter 25 uses that consumer variable to customize received electronic content to the end user. The amount of data which is sufficient is dependent on the particular consumer variable. For example, once personal profile database 27 has collected ten consumption format selections from this end user and all ten have been for video format, content adapter 25 may determine that this is sufficient data to customize incoming electronic information. However, content adapter 25 may determine that sufficient data has not been collected to customize colors if this end user has selected ten different fields, six of which were purple and four of which were green.

In one embodiment of the present invention, the end user is able to override any compiled user profile data. For example, even though the end user may select a field with the color purple most frequently, the end user is able to modify the user profile data to indicate that green is the preferred color. In one implementation, the statistic compilation process 26 uses this input by the end user for its data compilation. Alternatively, the statistic compilation process 26 may use the data collected by client activity monitor 24 for its data compilation, or the statistic compilation process 26 may utilize both the end user and the data collected by client activity monitor 24.

Statistic compilation process 26 compiles the user profile data contained in personal profile database 27 and transfers the compiled data to metering server 14. Statistic compilation process 26 aggregates the user profile data in personal profile database 27. That is, statistic compilation process 26 compiles all of the user profile data in personal profile database 27 except for information which identifies a particular individual. For example, information such as the end user's name, social security number, address and credit card numbers are not included in the compilation. Thus, client system 12 transfers the compiled data to metering server 14 without divulging any confidential information to the advertisers/publishers.

It should be noted that, under certain circumstances, identifying information such as a name and credit card number may be provided to the publisher/advertiser. For example, an advertisement for a camera received by the end user may have a "buy" option associated with it. If the end user selects the buy option, then session manager 29, transfers the end user's name, credit card number, and address to the advertiser. Given this information, the advertiser is able to charge the purchase price of the camera to the end user's credit card and ship the camera to the end user.

In one embodiment, client interface 23 provides the end user with access to personal profile database 27 which allows the end user to select certain criteria to be omitted from the compilation process. For example, an end user may select to omit details such as color preferences, income, marital status, age, gender, etc. Alternatively, for demographic information, the user may not initially provide certain information to the personal profile database 27, thereby preventing its inclusion in the compilation.

In one embodiment of the present invention, statistic compilation process 26 compiles electronic content-specific information for return to the metering server 14. This information includes, for example, how much time the end user spent consuming the electronic content, and how much of the content was consumed. For example, a particular advertisement may include ten different screens which are displayed to the end user. If the end user spends 15 seconds viewing the first screen and 15 seconds viewing the second screen and then terminates the advertisement, the statistic compilation process 26 transfers information to the metering server 14 indicating that an individual with this end user's user profile data spent 30 seconds viewing the electronic information and that the content was 20 percent consumed (that is, two screens out of ten were consumed). Additionally, information indicating the specific elements of the advertisements that were consumed (for example, the first two screens) is also transferred to the advertiser. Note that, as discussed above, this aggregate information does not reveal the identity of the end user who consumed the advertisement.

In one embodiment of the present invention, the client system 12 also includes an appraisal agent(s) 28. The appraisal agent 28 provides the end user with an agent which can search various yellow page servers 22 to locate electronic content which matches the end user's user profile data. For example, the end user may desire to view five different electronic advertisements per day. The appraisal agent 28 accesses the user profile data for the end user from the personal profile database 27 to determine the search criteria for this end user, and then sends a request(s) to yellow page servers 22 or content servers 21 to locate electronic information which matches the search criteria. In one implementation, the number of electronic advertisements a user desires to view per day is included in personal profile database 27. In one embodiment, multiple appraisal agents 28 may be initiated by a single end user, with each appraisal agent 28 performing a different search.

In one embodiment, the appraisal agent 28 sends requests to a yellow page server 22 rather than a content server 21, unless programmed to do otherwise. For example, when the end user instructs the appraisal agent 28 to search for electronic content, the appraisal agent 28 sends requests to yellow page servers 22. However, if an end user desires articles in a particular area of interest, the user can program the appraisal agent 28 to send requests to a content server 21 rather than a yellow page server 22.

Alternatively, the appraisal agent 28 may be programmed by the end user to locate a particular item. For example, the end user may program the appraisal agent 28 to locate, and possibly purchase, a camera. The end user would define the search criteria for the appraisal agent 28 to find an advertisement(s) for a camera which meets the end user's needs, such as a particular brand, features, price, etc. Once located, the advertisement is returned to the end user. Alternatively, the appraisal agent 28 may be programmed to purchase an advertised camera once an advertisement is found which matches the search criteria.

The appraisal agent 28 may be programmed to locate advertisements in a wide variety of manners. For example, the end user may input all or part of the search criteria, such as a particular item and manufacturer, directly to the appraisal agent 28 via a GUI. Alternatively, the appraisal agent 28 may obtain the search criteria by accessing the personal profile database 27 of the client system 12. For example, the appraisal agent 28 may access the personal profile database 27 to determine the end user's income, age, marital status and personal interests. Which characteristics are used as the search criteria may be pre-programmed in the appraisal agent 28 (for example, income and age), or may be indicated by the end user.

The appraisal agent 28 searches for information by making a request(s) to the yellow page servers 22. This request includes the search criteria and is transferred to the metering server 14. The session manager 38 of the metering server 14 receives and forwards the request to a yellow page server 22. The request is received by the session manager 78 of the yellow page server 22, shown in more detail in FIG. 5. Then, via the interactive process 76, session manager 78 accesses the advertising database 70 to determine whether electronic information in the advertising database 70 matches the search criteria of the request.

The session manger 78 determines whether a match exists by comparing the search criteria to consumer variables, key words, advertisement text, etc. stored with each advertisement in the advertising database 70. This data may be stored, for example, in header information along with each advertisement. Whether the session manager 78 determines a match exists is dependent on the request issued by appraisal agent 28. For example, if the appraisal agent 28 is programmed to purchase an item, such as a camera, having certain features (that is, the search criteria), then an exact match may be required. That is, several search criteria may be listed, such as price, manufacturer, color, etc., and a match occur only if each one of the several search criteria are satisfied by a particular advertisement. By way of another example, the appraisal agent 28 may be searching for electronic advertisements which match a set of several search criteria in order to return the advertisements to the end user. Under these circumstances only a portion of the search criteria, such as four out of seven criteria, may need to be satisfied, as indicated by the user. That is, if an advertisement is found which closely matches the search criteria, then the advertisement is returned to the end user, even if it isn't an exact match.

If the session manager 78 determines electronic information exists in the advertising database 70 which matches the search criteria, then the matching information is returned to the appraisal agent 28 via the metering server 14. Similarly, if the appraisal agent is programmed to purchase an item, such as a camera, and a match is found, then the appraisal agent 28 may place an order for the item and return a receipt to the end user, indicating that the item has been purchased.

In one embodiment of the present invention, all financial transactions for such purchases are encrypted in order to maintain consumer privacy. The transactions can be encrypted using any of a wide variety of commercially available encryption algorithms. In addition, all financial transactions are also digitally signed for authentication purposes. If a requested transaction does not include this digital signature, then the request is denied. This digital signature is input by a consumer, for example, utilizing a mouse or other cursor control device, or utilizing a pen and touch-sensitive input pad.

If, however, the session manager 78 determines that no electronic information exists in the advertising database 70 which matches the search criteria, then a response is returned to the appraisal agent indicating no match was found. In one embodiment, this response is indicated to the end user. Alternatively, the appraisal agent 28 may repeat this process by accessing another yellow page server 22. For example, the appraisal agent 28 may first access a local yellow page server 22 in an attempt to match the search criteria. If the search fails at the local level, the appraisal agent 28 may then access a regional yellow page server 22, and if that search is unacceptable, access a national yellow page server 22, etc.

In an alternate embodiment, the session manager 78 within a yellow page server 22 transfers a request from an appraisal agent 28 to multiple other yellow page servers 22 once the request is received. Thus, multiple yellow page servers 22 attempt to satisfy the search criteria concurrently, rather than requiring the appraisal agent 28 to send a request to each yellow page server 22 independently. If a yellow page server 22 contains an advertisement which satisfies the request, then the session manager 78 of that yellow page server 22 returns the matching information to the appraisal agent 28 and notifies the session manager 78 of the yellow page server 22 which received the request from the appraisal agent 28 that a match has been found. Alternatively, the yellow page server 22 which contains a match may return the matching information to the yellow page server 22 which received the request from the appraisal agent 28, which then returns the matching information to the appraisal agent 28.

When requesting electronic advertisements, the data returned to the end user is dependent on the end user's request. For example, the end user may define certain results which should occur based on how well the electronic information matches the search criteria. The appraisal agent 28 may be programmed to return the title of the electronic advertisement if it is only a 5% match to the search criteria, an abstract if it is a 25% match to the search criteria, and the entire advertisement if it is a 95% match to the search criteria. Alternatively, the appraisal agent 28 may be programmed to return only titles, regardless of how well the advertisements match.

In addition, an individual end user may desire to consume only a certain number of electronic advertisements. For example, a user may desire to view only five advertisements per day. This information can be made available to the appraisal agent 28, such as by directly inputting the information to the appraisal agent 28 or storing the information in the personal profile database 27 which is accessed by the appraisal agent 28. Thus, in one embodiment the appraisal agent 28 retrieves the specified number of electronic advertisements which match the search criteria of the end user each day. Alternatively, the appraisal agent may then display titles of 25 electronic advertisements which match the search criteria for the end user to review, and allow the end user to select which advertisements he or she will consume.

Thus, by retrieving electronic information which matches the search criteria (which reflects the user profile characteristics of the individual end user), the appraisal agent 28 provides electronic information which has a high probability of appealing to the end user.

In addition to receiving electronic information in the form of advertisements, the end user of client system 12 may also receive other electronic information, such as electronic content placed in clearinghouse servers 20 by publisher 18 or electronic content in content database 34 of metering server 14. For example, this electronic content may be a newspaper or magazine article, or an encyclopedia entry. In one embodiment, this electronic content contains the same consumer variables in header blocks as the electronic advertisements, and is customized by client system 12 in the same manner as discussed above.

Figure 3:
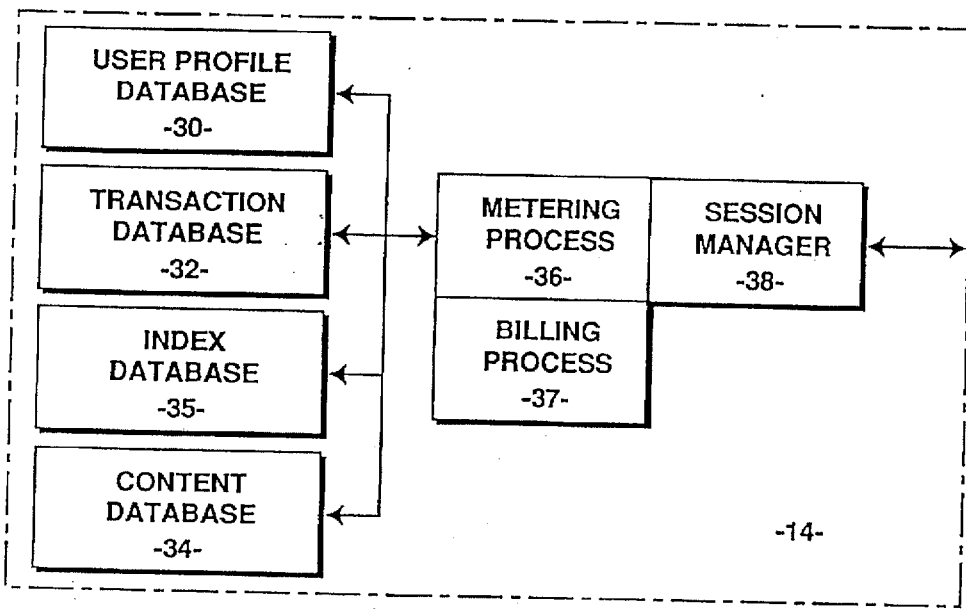
FIG. 3 is a schematic of a metering server in one embodiment of the present invention.

As shown in FIG. 3, resident within each metering server 14 is a user profile database 30, a transaction database 32, a content database 34 and an index database 35. The user profile database 30 contains aggregate profile data for the consumption devices served by the metering server 14 which is collected from the client systems 12, along with subscriber information. In one embodiment, the metering server 14 periodically requests the user profile data stored in the client systems 12.

The transaction database 32 contains the end user's account along with a log of the transaction, including the price of the transaction. The transaction database 32 may also contain the balance and a credit limit for each end user account. The content database 34 contains units of electronic information. The index database 35 contains titles for each electronic information unit. In one embodiment, the metering servers 14 also have access to a regional content database server(s) 21 which contains a larger content database.

Thus, the metering server 14 contains an account balance, a user identification (such as an account number or a name), and may also include information indicating which information the user subscribes to. User profile data requested by metering server 14 from the client systems 12 is stored in user profile database 30, along with user profile data corresponding to electronic information being consumed by an end user. As discussed above, this user profile data does not specifically identify the individual end user. The account balance and user identification is contained in the transaction database 32. Therefore, the only information which is contained in the metering server which identifies an individual end user is that user's identification and an account balance, thereby maintaining the user's privacy.

In one embodiment, the transaction database 32 also includes, in the log of a transaction, an indicator of the electronic information consumed. By maintaining such a log, the metering server 14 is able to summarize an end user's consumption for that user's review. For example, the metering server 14 may generate a monthly statement summarizing how much money the end user spent consuming electronic information.

Each metering server 14 also contains a metering process 36, a billing process 37 and a session manager 38. The metering and billing processes 36 and 37 access and process information in response to instructions from the session manager 38. For example, when an end user requests a unit of information, the request is received by the session manager 38. The session manager 38 instructs the metering process 36 to retrieve the requested unit of information. In one embodiment, the metering process 36 then initially accesses the user profile database 30 to determine whether the end user is a subscriber of the information. If the end user is a subscriber, the metering process 36 retrieves the unit of requested information from the content database 34, wherein the information can be transmitted to the end user.

If the end user is not a subscriber, the metering process 36 calculates the price of the requested information and accesses the transaction database to subtract the price from the balance of the end user's account. The balance is initially established when the end user requests an account in the system. The balance may be specified by the end user and approved by the clearinghouse server. Approval may be based upon a credit card number or bank account number provided by the end user. The balance may be updated by the clearinghouse server when the end user pays his bill. If the balance minus price is greater than zero, the metering process 36 retrieves the information and sends the same to the end user. If the balance minus price is less than zero, the metering process 36 does not return to the end information and may send a message to the end user that the balance has been exceeded. The initial balance of the account is typically set by a credit limit.

In one embodiment, requests for information are made by the appraisal agent 28. In this embodiment, the metering process 36 checks whether the content database 34 contains information matching the search criteria provided by appraisal agent 28. If a match exists, then electronic information is returned to the client system 12, provided the end user which initiated appraisal agent 28 is a subscriber of the information, or has a sufficient balance in his or her account to pay for the electronic information.

By way of another example, a clearinghouse server 20 may request billing information from the metering server 14 about the end users, or a specific end user. The session manager 38 receives the request and instructs the billing process 37 to retrieve the information. The billing process 37 then retrieves the billing information from the transaction database 32 and transfers the information to the clearinghouse server 20. The clearinghouse server 20 may also request user profile data, wherein the billing process 37 retrieves the profile data from the user profile database 30. Additionally, the information may be targeted to end users with specific profiles. Upon receiving and storing the targeted information in the content database 34, the metering process 36 accesses the user profile database 30 to find end users with matching profiles. The metering process 36 then sends the content titles to the end users with matching profiles.

In one embodiment, the software tools also provide an interactivity builder to allow the end user to interact with the electronic information. For example, the electronic information may be a content database that is analogous to the "yellow pages" of a phone book. The yellow page content database may contain a plurality of advertisements that can be viewed by the end user. The software tools may allow the publisher to build an object that allows the end user to search the contents of the content database. The software tools may also allow the publisher/advertiser to combine different types of information. For example, the publisher can combine video, audio, graphics, animation and text all within the same unit of electronic information provided to the end user.

The software tools include "cost type" and "cost value" fields that accompany each unit of electronic information. The cost type and cost value can be utilized to calculate a price that can be either credited to or debited from the end users. The fields allow the publisher/advertiser 18 to establish the manner in which the information will be charged to the end user's account. One example of a cost type is "pay per view" payment method, wherein the end user pays an associated cost each time the user consumes a unit of information. This cost may also be proportional to the amount consumed, so that the cost is higher for consuming the entire unit information rather than a smaller portion, such as the abstract. This type of payment may be desirable for information which is typically seldom consumed by the end user. Other cost types include payment on a per byte or word of information viewed by the end user, or payment for the period of time that the user consumes the information. These cost types may be desirable when the end user is accessing a database that contains, for example, corporate or individual credit information, or the drawings and text of a patent database.

The user may also subscribe to units of information, either individually, or through a group such as the employer of the end user. For example, the end user may wish to subscribe to a news database that provides the end user news information upon command for a monthly, yearly, etc. charge. The cost types may also include a one-time charge for a unit of information, wherein the end user is granted access to the unit of information for the life of the unit.

The cost types may be provided as part of a menu that can be selected by the publisher. For example, the menu may appear to the publisher as follows:

---
"Pay Per View"
"Pay Per Byte"
"Pay Per Time"
..."

---

The cost value is provided in a different field and may be embodied by a simple data entry by the publisher. For example, if the pay per view cost type is selected, the publisher may enter "$1.00". If the pay per byte cost type is selected, the publisher may enter "$0.10 per Mbyte", and so forth and so on. The tools may also allow the publisher to associate a plurality of cost types and corresponding cost values with the same content of information.

In addition to debit models, the software tools may also allow the publisher/advertiser 18 to build a credit model which credits the end user's account each time the user views a unit of information. This model is particularly useful for advertisers who may want to credit the end user's account to encourage the user to consume an advertisement. By way of example, the credit model can be used in association with the yellow pages content database. The publisher/advertiser may also be provided with a field that allows the publisher/advertiser to select between credit and debit.

In one embodiment, the software tools allow the publisher/advertiser 18 to request certain profile data associated with the consumption of a unit of information. For example, associated with a unit of information may be a request to provide the publisher/advertiser with certain user profile data such as the age or income of the viewers who viewed the information. Additionally, the tools may also allow the publisher to request that the unit of information be directed only to end users that have a certain profile. For example, the publisher/advertiser may request that a unit of information be directed only to male end users or end users that have historically viewed news items. The target user profile may be associated with a pricing hierarchy for advertising information, such that a targeted end user receives a larger price credit than an end user that was not targeted by the advertiser.

The publisher/advertiser is also provided with an account number so that the charges associated with the consumption of information provided by the publisher/advertiser is charged to the account number of the publisher/advertiser. For example, a publisher may provide a unit of information which is subsequently consumed by the end user. The charge incurred by the end user is then debited against the user's account and credited to the publisher's account. By way of another example, the end user may view an advertisement, wherein the charge associated with the unit of information viewed is credited to the end user's account and debited to the advertiser's account.

Figure 4:
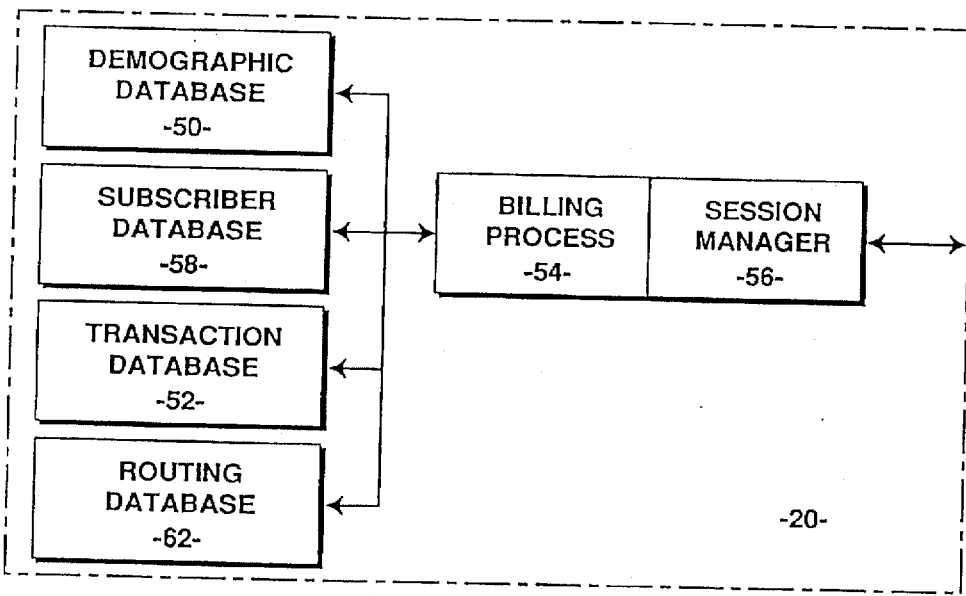
FIG. 4 is a schematic of a clearinghouse server in one embodiment of the present invention.

As shown in FIG. 4, each clearinghouse server 20 contains a demographic database 50, a transaction database 52, billing process 54 and a session manager 56. The demographic database 50 contains user profile data collected from the metering servers 14. The transaction database 52 contains billing information relating to the end users. The transaction database 52 also contains data relating to the accounts of the publishers/advertisers 18. The billing process 54 can access and process data within the databases 50 and 52. For example, when an end user consumes a unit of electronic information, data relating to the consumption of the electronic information may be sent from the billing server 14 to the clearinghouse server 20. The session manager 56 instructs the billing process 54 to charge the publisher/advertiser account within the transaction database 52. The clearinghouse server 20 may also receive user profile data from the metering servers 14 which is subsequently stored by the billing process 54 in the demographic database 50.

In one embodiment, the billing process 54 also provides the publisher/advertiser 18 with requested user profile data. For example, the publisher/advertiser may send a unit of information along with a request for certain user profile data of the end users who view the information. The clearinghouse server 20 compiles the user profile data of the end users who view the information and forward the compiled user profile data to the publisher.

The billing process 54 of the clearinghouse server can also direct a unit of electronic information to metering servers that service end users with a profile that correlates to a targeted user profile characteristic. For example, the publisher may request that a unit of electronic information be directed to end users with a certain income, etc. The demographic database 50 may contain data relating to which metering servers 14 service end users with corresponding user profile characteristics. The clearinghouse server 20 correlates the requested user profile data with certain identified metering servers and sends the unit of electronic information only to the selected metering servers, which then forward the electronic information to the end users. The clearinghouse server may also have a subscriber database 58 that contains a list of all the metering servers and whether a subscribing end user is associated with the metering server. If the electronic information provided by the publisher is for subscribers, the billing process 54 accesses the subscriber database 58 and provides the information to metering servers that have corresponding subscribers.

The clearinghouse server 20 correlates the user profile data of an end user with a metering server without specifically "knowing" the identity of the end user. This feature increases the privacy of the end user so that an external entity cannot find out the type or content of information being viewed by a specific end user. The clearinghouse server 20 and metering server 14 may also contain access control security features which prevent an illegal access of the databases that reside within the server.

In one embodiment, the billing process 54 also generates bills for the end users and the publishers/advertisers. Upon a request from the publisher/advertiser, the session manager 56 instructs the billing process 54 to generate a bill. The billing process 54 retrieves the billing information from the transaction database 52 and generates a bill. The bill may be electronically transferred to the end user or sent through a conventional mail service. The billing process 54 may also generate bills that are transmitted to the publishers/advertisers. The bill may be generated periodically in accordance with header information that accompanies the content that is generated by a publisher/advertiser. Alternatively, the clearinghouse server 20 may utilize consumer credit cards and/or bank accounts for billing. For example, amounts owed by the consumer for consumption of electronic content and amounts due the consumer for consumption of electronic advertisements may be charged or credited, respectively, to the consumer's credit card or bank account.

In one embodiment, the clearinghouse server may contain a routing database 62 that contains indexes for access to databases external to the system. The routing database 62 is used to direct access requests to remote databases that do not reside in the metering servers 14.

The clearinghouse server 20 can also credit or debit the publisher/advertiser account for electronic information sent by another publisher/advertiser. For example, advertising information generated by an advertiser and viewed by an end user can be credited to the account of a publisher if the advertising information is associated with electronic information provided by the publisher. By way of example, the clearinghouse server 20 can replace the conventional billing system between advertisers and publishers that is present in traditional newspaper advertising.

The metering server 14 is capable of storing units of information relating to the content databases of the publisher/advertiser, including the entire content database. The publisher may periodically update the contents of the database. The content may be initially transferred from the publisher/advertiser 18 to the clearinghouse server 20, which retransmits the content to regional 21 and metering 14 servers. The content received by the metering server 14 from the publisher may include content titles that summarily describe the contents and are stored in the index databases 35 of the metering servers 14. The metering server 14 transmits the titles and possibly a portion of the content to the client systems 12. If the end user wants to consume the electronic information, the user generates a request for the electronic information, typically by providing an input to the GUI of the client system 12. The metering server 14 receives the request and sends the information in accordance with the metering methodology of the system. In addition, requests for electronic information may also be made through the appraisal agent 28 of client system 12.

When an end user requests electronic information, such as via an appraisal agent 28, the metering server 14 calculates the price of consuming the electronic information from the cost type and the cost value associated with the information. By way of example, the metering process 36 subtracts the price from the account balance and then determines whether the result is greater than zero. If the price of consuming the electronic information does not exceed the balance, the metering server 14 sends the unit of electronic information to the end user. If the price does exceed the balance, the metering server 14 does not send the electronic information to the end user and may inform the end user of the remaining balance. If the cost type associated with the information is per time or per byte/word, the metering server may periodically determine if the balance is being exceeded by the consumption of information. The metering server may terminate the transmission of information if the price of the information exceeds the balance. The metering server 14 may also periodically transfer the balance, the charges and the associated billing information of the end user to the clearinghouse server 20 for billing.

In one embodiment, the metering server 14 also transfers requested user profile information to the clearinghouse server 20. For example, the publisher 18 may transfer a unit of information to the metering server 14 via the clearinghouse server 20, along with a request to transmit user profile data associated with the end users who consume the electronic information. When an end user requests information, the metering process 36 associates the information with the aggregate user profile data of the user in the user profile database 30. The metering server 14 then sends the user profile data to the clearinghouse server 20 which compiles the data.

Figure 5:
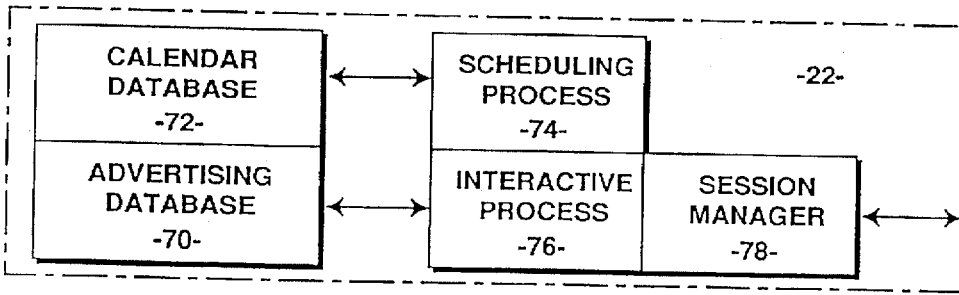
FIG. 5 is a schematic of a yellow page server in one embodiment of the present invention.

As shown in FIG. 5, the yellow page server 22 contains a resident advertising database 70, a calendar database 72, a scheduling process 74, an interactive process 76 and a session manager 78. The yellow page server 22 receives and stores electronic advertising information from an advertiser 18 in the advertising database 70. The advertising database 70 may contain electronic information that is generated by advertisers or by the end users. By way of example, an end user generated electronic advertisement may be analogous to a "classified ad". To create end user generated advertisements, the client systems may be provided with the same electronic publishing tools as the advertiser. The electronic advertising information typically includes advertising titles. The electronic advertising information may also have header information containing targeted user profile data. The metering process 36 accesses the user profile databases and correlates the targeted user profile data with metering servers that service end users with the targeted profiles. Metering servers with corresponding target profiles are provided with the advertising titles.

The calendar database 72 contains advertiser's scheduling and availability information. For example, an end user/advertiser may generate an advertisement that specifies a service such as lawn mowing. The end user/advertiser may also include an availability schedule within the calendar database 72 which allows an end user who consumes the advertisement to view and request the service at a specified date and time. The scheduling process 74 allows the end user to access the calendar database 72 to view and schedule a time, etc.

Each client system 12 may have a running cooperative process that provides the advertising information to the end user. The GUI of the client system may provide a visual or audio indication that an advertising title has been received by the end user computer. The end user can then review the advertising title and request the electronic advertisement if desired. The metering server then retrieves the electronic advertisement from the yellow page server for subsequent transmittal to the end user. Although an electronic advertisement has been described, it is to be understood that a unit of electronic information from a publisher may also be distributed to the client systems 12 in this manner.

Alternatively, the end user may initiate a request of an advertising content database 70 such as a "yellow pages" which is stored in the advertising database of the yellow pages server 22. The interactive process 76 allows the end user to search and view advertisements from a library(s) of ads. The interactive process 76 may allow the end user to answer queries and take alternate paths to external databases. The interactive model may also allow the end user to initiate a query with the advertiser requesting follow-up information.

The metering server 14 in conjunction with the client activity monitor 24 of the client system may monitor the end user's consumption of electronic advertising information and provide user profile data to the metering server 14 relating to the end user. For example, the metering process 36 may monitor the amount of time an end user spends viewing an electronic advertisement, or which particular advertisement or page of the advertisement was of interest to the end user. The metering process 36 may further monitor what answers were provided by the user, or paths taken by the user in an interactive model, along with follow-up requests initiated by the end user in an interactive model. This information is then forwarded to the clearinghouse server 20 for compilation.

In addition to the monitoring taking place at the metering server 14, a finer granularity monitoring process takes place at each client system 12, as described above. The results of this monitoring at each client system 12 is encoded and stored for that consumer in the personal profile database 27 of the client system 12.

Figure 6:
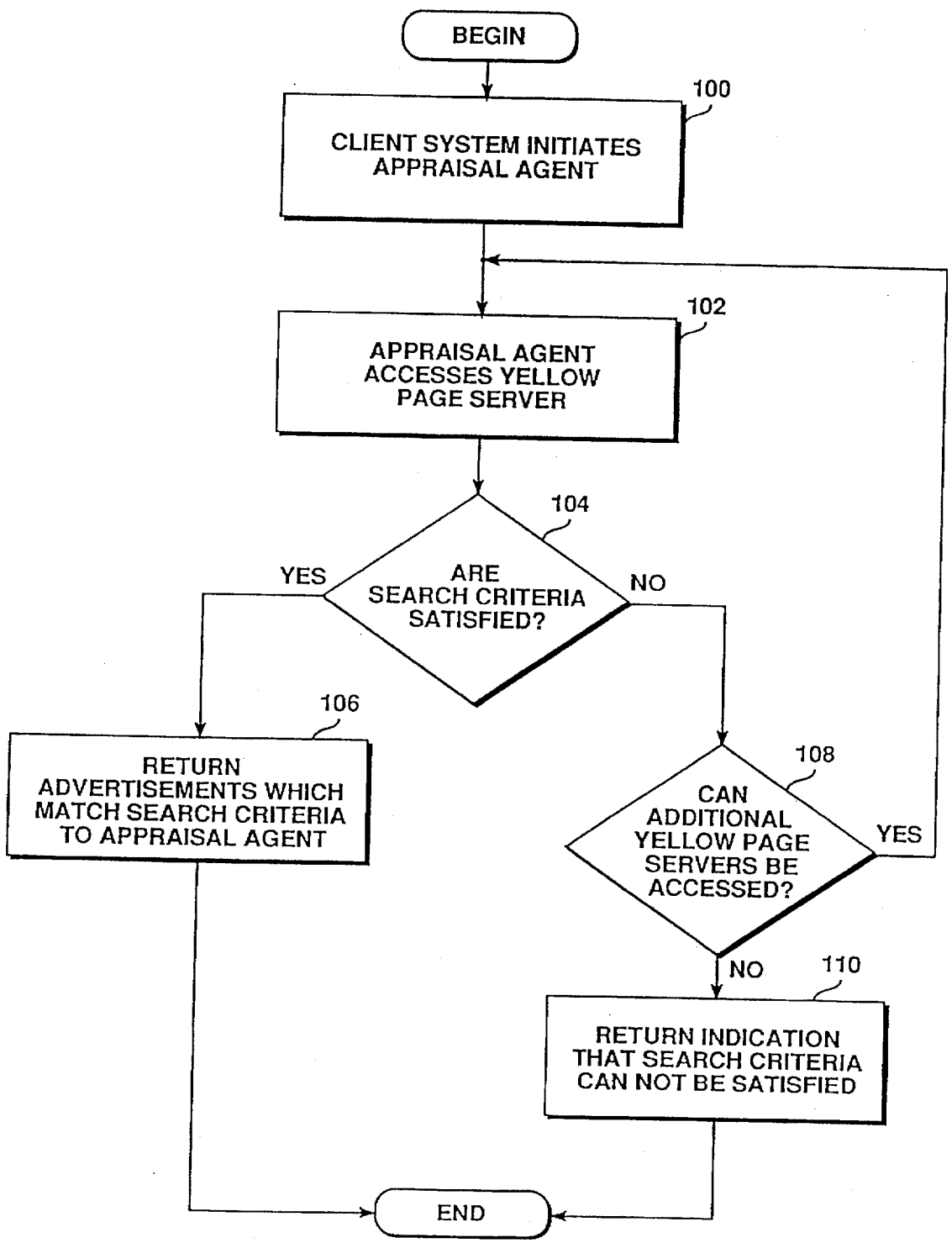
FIG. 6 is a flow diagram showing the steps followed by an electronic information appraisal agent in an electronic information distribution network in one embodiment of the present invention.

FIG. 6 is a flow diagram showing the steps followed by an electronic information appraisal agent in an electronic information distribution network in one embodiment of the present invention. The appraisal agent 28 is first initiated, step 100. In one embodiment, the appraisal agent 28 is initiated by the end user. For example, the end user may define the search criteria to the appraisal agent 28 and enter a command for the appraisal agent 28 to begin its search. Alternatively, the appraisal agent 28 may be programmed to initiate searches periodically, such as on a daily basis. In addition, the appraisal agent 28 may be programmed to initiate searches at a particular time, such as late at night or early in the morning. Such programming may be beneficial, for example, if the cost of accessing the network is different for different times of the day (for example, the cost of access may be more expensive during normal "business hours" than during late night hours).

Once the appraisal agent 28 is initiated, the agent 28 accesses a yellow page server 22, step 102. The appraisal agent 28 sends a request to the yellow page server 22, along with the search criteria. In one embodiment, the electronic information network includes multiple yellow page servers 22, such as local, regional and national servers. In one implementation, the first yellow page server 22 accessed is a local yellow page server. The yellow page server 22 then determines whether the search criteria match any of the electronic advertisements stored in the yellow page server 22, step 104. If a match does exist, then the advertisements (or advertisement) which match the search criteria are returned to the appraisal agent, step 106. Alternatively, only a portion of the advertisements may be returned, based on how well the advertisements match the search criteria, as discussed above. In an alternate embodiment, an item, such as a camera, is ordered by the appraisal agent 28 provided a match is found.

Once the advertisements are returned to the appraisal agent 28, they are transferred to the client interface 23 and made available for the end user's consumption. In one embodiment, the advertisements are transferred to the client interface 23 via the content adapter 25, thereby customizing the advertisements for consumption by the individual end user. For example, the colors of particular fields in the information may be changed, based on the individual end user's preference. In addition, one of the formats the contents of the information is received in, such as text or video, may be selected by the client system for consumption by the individual end user based on the individual end user's preferences, which are stored in the personal profile database 27.

Returning to step 104, if the search criteria are not satisfied, then the appraisal agent 28 checks whether an additional yellow page server can be accessed which has not already been searched with this request, step 108. This additional yellow page server may be a regional or national server, or another local server. If an additional yellow pager server 22 can be accessed, then steps 102 and 104 are repeated with the new server. Thus, following these steps, the appraisal agent 28 accesses all accessible yellow page servers 22 until the search criteria are satisfied. Alternatively, the yellow page server 22 may forward the request and search criteria to another yellow page server 22, thereby allowing the appraisal agent 28 to issue a single request which accesses multiple yellow page servers 22.

If, however, no additional yellow page servers 22 can be accessed in step 108, then the appraisal agent 28 returns an indication to the end user that the search criteria can not be satisfied. In an alternate embodiment, the appraisal agent 28 may have multiple search criteria which have different "values". For example, the end user may indicate, or the personal profile database may contain information indicating, that an advertisement must contain certain criteria, however certain other criteria are not essential. For example, the end user may indicate that advertisements must satisfy his or her age, however not necessarily his or her income level. In this situation, the appraisal agent 28 may, upon failing to locate advertisements which satisfy both the user's age and income level, repeat steps 102 and 104 with a second request which requires that the age be satisfied but not the income level.

It will be appreciated that, although FIG. 6 references accessing a yellow page server, the steps shown apply analogously to other types of electronic information servers. For example, an electronic information appraisal agent could access the electronic information contents of a metering server 14, regional content server 21, or clearinghouse server 20 in the manner shown in FIG. 6.

Thus, the present invention selects a set of electronic information units (such as articles or advertisements) to be displayed to the end user which should appeal to the end user based on his or her user profile characteristics. Therefore, the appraisal agent of the present invention automatically retrieves electronic information which has a high probability of appealing to the end user, thereby alleviating the burden on individual users of spending time browsing through electronic information. Furthermore, in one embodiment the present invention automatically searches for products requested by the user, and orders the products when they are found.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, an electronic information appraisal agent has been described.

What is claimed is:

1. An electronic information distribution system comprising:

an electronic information server which contains a plurality of electronic information units;

a client system including an electronic information appraisal agent, wherein the client system is a consumer consumption device configured to provide an interface to a consumer for allowing the consumer to consume electronic information units, and wherein the appraisal agent is configured to automatically access the electronic information server at periodic intervals and retrieve a set of the plurality of electronic information units from the electronic information server based on a set of search criteria provided to the appraisal agent; and a metering server coupled to the electronic information server and the client system configured to allow the client system to communicate with the electronic information server.

2. The system of claim 1, wherein the electronic information server is a local electronic information server, wherein the system further comprises a regional electronic information server, wherein the appraisal agent is configured to automatically access the local electronic information server in an attempt to match the set of search criteria and return the set of the plurality of electronic information units if the set of search criteria are matched by the set of the plurality of electronic information units, and otherwise to automatically access the regional electronic information server in an attempt to match the set of search criteria.

3. The system of claim 1, wherein the metering server is also coupled to a plurality of additional client systems.

4. The system of claim 3, wherein the client system and the plurality of additional client systems are coupled together in a local area network.

5. The system of claim 1, wherein the client system also includes a personal profile database coupled to the appraisal agent which stores user profile information corresponding to the consumer, wherein the set of search criteria is provided to the appraisal agent by the personal profile database.

6. The system of claim 5, wherein the user profile information includes demographic and psychographic information.

7. The system of claim 1, wherein the interface of the client system is also configured to allow the consumer to interact with the electronic information appraisal agent.

8. The system of claim 1, wherein the electronic information server is an electronic yellow pages server.

9. The system of claim 1, wherein the client system is a personal computer.

10. A method of automatically accessing electronic advertisements in an electronic information distribution network, the method comprising the steps of:

(a) initiating an electronic advertisement appraisal agent in a client system, wherein the client system is a consumer consumption device which provides an interface to a consumer that allows the consumer to consume electronic information units;

(b) the appraisal agent accessing a yellow pages server which contains a plurality of electronic advertisements, wherein the yellow pages server is coupled to the client system;

(c) comparing electronic advertisements in the yellow pages server to search criteria provided to the appraisal agent;

(d) determining whether an electronic advertisement of the plurality of electronic advertisements matches the search criteria based on the comparing;

(e) returning a set of the plurality of electronic advertisements to the client system, provided the comparing results in a match; and (f) periodically repeating the steps (b)–(e).

11. The method of claim 10, wherein the yellow pages server is a first local yellow pages server, the method further comprising the step of:

(g) the appraisal agent accessing a regional yellow pages server provided the comparing determines the first local yellow pages server contains no electronic advertisements which match the search criteria.

12. The method of claim 10, wherein the yellow pages server is a first local yellow pages server, the method further comprising the step of:

(g) the appraisal agent accessing a second local yellow pages server provided the comparing determines the first local yellow pages server contains no electronic advertisements which match the search criteria.

13. The method of claim 10, wherein the determining comprises indicating an electronic advertisement of the plurality of electronic advertisements matches the search criteria when a predetermined proportion of the search criteria are satisfied by the electronic advertisement.

14. The method of claim 13, wherein the step (e) comprises returning a portion of each electronic advertisement of the set of the plurality of electronic advertisements to the client system in proportion to how well the search criteria are satisfied by each electronic advertisement.

15. The method of claim 10, further comprising the step of:

the appraisal agent accessing a personal profile database included in the client system to obtain the search criteria.

16. The method of claim 10, wherein the step (c) comprises comparing the search criteria to consumer variables contained in each electronic advertisement.

17. A method of obtaining a product in an electronic information distribution network, the method comprising the steps of:

(a) initiating an electronic information appraisal agent in a client system, wherein the client system is a consumer consumption device which provides an interface to a consumer that allows the consumer to consume electronic information units;

(b) the appraisal agent accessing an electronic information server which contains a plurality of electronic information units, wherein the electronic information server is coupled to the client system;

(c) comparing electronic information in the electronic information server to a set of search criteria corresponding to the product provided to the appraisal agent;

(d) determining whether an electronic information unit of the plurality of electronic information units matches the set of search criteria based on the comparing;

(e) purchasing a product associated with the electronic information unit, provided the comparing results in a match; and (f) periodically repeating the steps (b)–(e).

18. The method of claim 17, wherein the determining comprises indicating the electronic information unit of the plurality of electronic information units matches the set of search criteria when all criteria of the set of search criteria are satisfied by the electronic information unit.

19. The method of claim 17, wherein the electronic information server is a local electronic information server, the method further comprising the step of:

(g) the appraisal agent accessing a regional electronic information server provided the comparing determines the local electronic information server contains no electronic information units which match the set of search criteria.

20. The method of claim 17, wherein the step (c) comprises comparing the set of search criteria to consumer variables contained in each electronic information unit.

21. An apparatus comprising:

a session manager to transfer data to and from an electronic information distribution network; and an electronic information appraisal agent, coupled to the session manager, to automatically and periodically, access an electronic information server of the electronic information distribution network which contains a plurality of electronic information units, compare electronic information in the electronic information server to a set of search criteria provided to the appraisal agent, determine whether an electronic information unit of the plurality of electronic information units matches the set of search criteria based on the comparison, and return the electronic information unit to the session manager, provided the comparison results in a match.

22. The apparatus of claim 21, wherein the appraisal agent is further configured to purchase a product associated with the electronic information unit, provided the comparison results in a match.

* * * * *